Dec. 21, 1965  L. F. JOHNSON ETAL  3,225,306
OPTICAL MASER USING TRIVALENT NEODYMIUM IONS
IN A CALCIUM TUNGSTATE HOST LATTICE
Filed Sept. 19, 1961
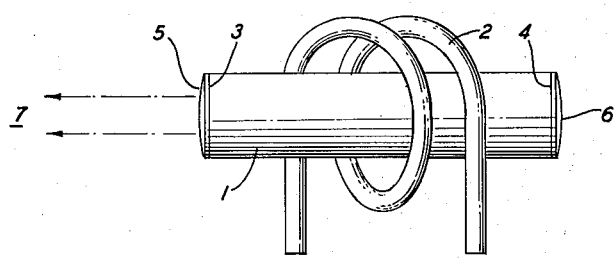
INVENTORS L. F. JOHNSON
K. NASSAU
BY
ATTORNEY 3,225,306
OPTICAL MASER USING TRIVALENT NEODYM-
IUM IONS IN A CALCIUM TUNGSTATE HOST
LATTICE
Leo F. Johnson, Plainfield, and Kurt Nassau, Springfield,
N.J., assignors to Bell Telephone Laboratories, Incorporated, New York, N.Y., a corporation of New York
Filed Sept. 19, 1961, Ser. No. 139,266
4 Claims. (Cl. 331—94.5)

This invention relates to optical masers for use in the infrared portion of the optical spectrum. The materials of the invention include a calcium tungstate host lattice and additionally contain neodymium ions in the 3+ valence state.

Recently, considerable attention has been focused on a new class of solid state maser devices which are capable of generating or amplifying coherent electromagnetic wave energy in the optical frequency range. Devices of this type, which are described, for example, in United States Patent 2,929,922 to Schawlow and Townes, are considered to be operable over the spectral range from far infrared to ultraviolet.

Typically, a maser of the type known in the art employs an active material characterized by a plurality of distinct energy levels, the separation of these levels corresponding to frequencies within the desired operating frequency ranges. More particularly, the separation between two of the energy levels $E_1$ and $E_2$ corresponds to quantized wave energy having a frequency $\nu_{12}$ given by Bohr's equation $$\nu_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a metastable higher level. The excited electrons tend to remain in the upper level for a short time before decaying or relaxing to the lower level. The downward transition is normally accompanied by the radiation of wave energy of the frequency corresponding to separation between the energy levels concerned. During maser operation sufficient pump power is supplied to the active medium to produce, at least intermittently, a nonequilibrium population distribution between the pair of energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the metastable state, and that the stimulated emission is coherent and in phase with the signal.

Among the more promising forms of maser are those which utilize an active medium characterized by first, second and third successively higher electron energy levels. Typically, in optical maser materials the upper level is relatively broad, and in some cases is best described as a band. Continuous wave operation of such three-level devices may be achieved, for example, by pumping electrons from the first to the third level and allowing them to relax spontaneously to the second level, thereby producing the desired population inversion between the second and first levels. Advantageously, in masers of this type, the relaxation time between the third and second levels is shorter than that between the second and first levels.

Among the more promising active maser materials are those which comprise a host crystal containing paramagnetic ions from which the stimulated emission occurs. The host crystal must be of a material capable of accepting the paramagnetic ions in such a way that they are able, upon excitation, to fluoresce with good over-all quantum efficiency, with as much as possible of the emitted energy concentrated in a single narrow spectral line. Such a material is ruby, which continues to be widely used as an optical maser medium and is, in fact, one of the very few materials which have been operated successfully. Ruby has usable emission lines at 6943 A. and 6921 A. In addition, ruby having a high concentration of chromium ions is characterized by sharp satellite lines at 7009 A. and 7041 A.

Ruby optical masers of the usual design are, however, subject to the disadvantage of requiring a high pump power to establish the required population inversion. The amount of power supplied to the ruby and the conditions of its absorption by the crystal have thus far limited ruby maser operation to producing a pulsed beam of coherent light. It is apparent, however, that in many applications it is highly desirable to produce continuous coherent light beams by maser action.

Furthermore, it is to be noted that the choice of active medium for an optical maser device governs the frequency of the usable emission lines. Thus, it is desirable to provide a variety of optical maser materials in order to make possible the generation and amplification of coherent light beams over the wider range of the optical frequency spectrum.

An object of the invention is the generation and amplification of coherent radiation in the infrared portion of the optical frequency spectrum.

It is also an object of the invention to provide an optical maser capable of operation in the infrared range and requiring a relatively low pumping power.

In accordance with this invention, a new fluorescent material suitable for use in optical masers has been discovered. This material consists of a calcium tungstate host lattice in which some of the calcium ions have been replaced by neodymium ions in the 3+ valence state. Trivalent neodymium is the active maser medium and stimulated emission is produced at room temperature at 1.0646 microns in the infrared region. The infrared fluorescence line is shifted slightly at lower temperatures. At 77 degrees K., for example, stimulated emission is produced at 1.063 microns.

A feature of the invention is an optical maser having an active medium consisting of trivalent neodymium ions in a calcium tungstate host crystal.

An optical maser in accordance with the invention is shown in the figure. There is depicted a rod-shaped crystal 1 of calcium tungstate having an appropriate small concentration of trivalent neodymium ions as disclosed herein. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4, thereby forming an optical cavity resonator of the type described in a copending patent application Serial No. 61,205, filed October 7, 1960, by Boyd, Fox and Li, and issued as United States Patent Number 3,055,257. Advantageously, layer 6 is totally reflecting while layer 5 includes at least a portion which is only partially reflecting to permit the escape of coherent radiation 7 having a wavelength of about 1.06 microns. If desired, rod 1 during operation may be maintained in a bath of liquid gas, such as nitrogen, to maintain a low temperature with the desirable results hereinafter described.

The lamp 2 is advantageously of a type which produces intense radiation over a broad band extending to 4,000 A.

(.4 microns) to longer wavelengths. Mercury or xenon lamps are considered useful to pump the material of the invention, which is characterized by a plurality of very sharp absorption lines in the specified spectral range. Other types of lamps may, of course, be employed provided they emit sufficient energy at wavelengths corresponding to one or more absorption lines of the material. Electrons in the active medium are excited to upper energy levels by the pump power and relax in nonradiative transitions to an intermediate level corresponding to the $^4F_{3/2}$ level of free neodymium ions. This level corresponds to the metastable level of the above-mentioned exemplary three-level system. A negative temperature is thus created between the $^4F_{3/2}$ and the $^4I_{11/2}$ levels. The $^4I_{11/2}$ level lies about 2,000 cm.$^{-1}$ above the ground state and has a negligible population at room temperature. Stimulated emission at 1.06 microns in the infrared may then be obtained.

An optical maser of the type illustrated in the figure has been operated using as an active medium calcium tungstate containing .14 atomic percent of neodymium in place of calcium. The device produced intense emission at 1.06 microns in the infrared. At room temperature the emission line is very narrow, being about 12 wave numbers wide. At liquid nitrogen temperatures this width is further reduced to about 7 wave numbers. Maser action may be achieved over a range of neodymium concentration. Although in principle there is no lower limit on the concentration of Nd$^{+3}$ which may be employed in the crystal 1, yet a practical limit of about 0.01 percent is imposed by the necessity of having sufficient unpaired electrons available to produce a useful output.

Additionally, the preferred concentration of Nd$^{+3}$ ions in the CaWO$_4$ host crystal is deemed to be about 1 percent. Such a concentration appears desirable from the standpoint of maximum intensity in the narrowest possible line. However, useful concentrations are deemed to extend as far as 3 percent Nd$^{+3}$. Beyond 3 percent increasing account must be taken of line broadening due to interaction among the neodymium ions themselves. Although stimulated emission may be obtained with concentrations as high as 5 percent, most applications will require a maximum of about 3 percent. Furthermore, crystals having more than about 3 percent neodymium ions are somewhat more difficult to manufacture than are those having smaller concentrations.

From measurements made on the device described above, it is estimated that, at room temperature, the power required to operate a maser in accordance with the invention is about 0.5 percent of that required to operate a ruby maser of similar configuration under the same condition. Active maser media based on samarium are not operable at room temperature.

The material of the invention is conveniently made by a method generally designated as the Czochralski method. Reference may be made to an article by J. Czochralski in Z. Physik, Chemie, vol. 92, pages 219–221 (1918). A recent description of the process is to be found in an article by K. Nassau and L. G. Van Uitert in Journal of Applied Physics, vol. 31, page 1508 (1960). Among the other techniques which may be employed are the flame fusion, hydrothermal flux and spontaneous nucleation techniques.

A particular sample of the substance was prepared by placing 200 grams of CaWO$_4$ in an iridium crucible and melting it. 0.6 gram of Nd$_2$O$_3$ and 1.2 grams of WO$_3$ were then added to the melt and a homogeneous mixture produced. A seed crystal of the desired orientation was inserted into the top surface of the melt and was simultaneously rotated and drawn from the melt. Good results were obtained when the speed of rotation was about 30 r.p.m. and the rate of pulling or drawing was about ½ inch per hour. The resulting calcium tungstate crystal contained about .14 percent neodymium ions in place of calcium.

It will be noted that a considerable excess of neodymium ions was added to the melt. In general, it has been found that the concentration of neodymium in the crystal is about one-fourth of that in the melt. Neodymium may be also added in various other forms such as Nd$_2$(WO$_4$)$_3$ or NaNdW$_2$O$_8$.

Although the invention has been described with reference to a specific embodiment, this is to be construed by way of illustration and does not limit the scope of the invention. For example, the material of the invention may be used with any concentration of neodymium in the ranges set forth. Furthermore, the material may be used in optical cavity resonators other than the confocal type. The parallel plate resonator, as well as others, may also be employed. Other variations are also possible within the spirit of the invention.

What is claimed is:

1. An optical maser comprising a negative temperature medium consisting essentially of a substantially monocrystalline calcium tungstate host lattice in which a portion of the calcium ions have been replaced by neodymium ions in the trivalent state, the portion of calcium ions so replaced being in the range of from 0.01 percent to 5 percent, means for producing a population inversion between a pair of optically connected energy levels of said neodymium ions, and means for stimulating coherent emission at the wavelength corresponding to the energy separation of said levels.

2. An optical maser comprising a negative temperature medium consisting essentially of a substantially monocrystalline calcium tungstate host lattice in which a portion of the calcium ions have been replaced by neodymium ions in the trivalent state, the portion of calcium ions so replaced being in the range of from 0.01 percent to 3 percent, means for producing a population inversion between a pair of optically connected energy levels of said neodymium ions, and means for stimulating coherent emission at the wavelength corresponding to the energy separation of said levels.

3. An optical maser comprising means forming an optical cavity resonator, a negative temperature medium disposed within said resonator, said medium consisting essentially of substantially monocrystalline calcium tungstate host lattice in which a portion of the calcium ions have been replaced by neodymium ions in the trivalent state, the portion of calcium ions so replaced being in the range of from about 0.01 percent to about 5 percent, and means for pumping said medium to produce a population inversion between a pair of optically connected energy levels of said neodymium ions.

4. An optical maser comprising a rod shaped substantially monocrystalline negative temperature medium consisting essentially of calcium tungstate in which a portion of of the calcium ions have been replaced by trivalent neodymium ions, the portion so replaced being in the range from 0.01 percent to 5 percent, said rod having confocal spherical end surfaces, said end surfaces being covered with a reflective layer thereby forming an optical cavity resonator in said medium, and pumping means disposed about said rod for producing a population inversion between a pair of optically connected energy levels of said neodymium ions.

References Cited by the Examiner

UNITED STATES PATENTS 2,929,922　3/1960　Schawlow et al. _____ 88—1
3,055,257　9/1962　Boyd et al _____ 88—1

OTHER REFERENCES

Kroger: "Some Aspects of the Luminescence of Solids," Elsevier Pub. Co. Inc., New York, 1948, pp. 144, 146 and 293.

JEWELL H. PEDERSEN, *Primary Examiner.*

JOSEPH R. LIBERMAN, *Examiner.*